(12) United States Patent
Hutton

(10) Patent No.: US 11,686,158 B2
(45) Date of Patent: Jun. 27, 2023

(54) FLUID CONTROL VALVE FOR ROTARY STEERABLE TOOL

(71) Applicant: REME, LLC, Conroe, TX (US)

(72) Inventor: Richard Hutton, Avon (GB)

(*) Notice: Subject to any disclaimer, the term of this patent is extended or adjusted under 35 U.S.C. 154(b) by 0 days.

(21) Appl. No.: 17/958,891

(22) Filed: Oct. 3, 2022

(65) Prior Publication Data
US 2023/0021983 A1    Jan. 26, 2023

(30) Foreign Application Priority Data
May 12, 2021  (WO) .............. PCT/GB2021/051145

(51) Int. Cl.
| E21B 7/06 | (2006.01) |
| F16K 11/07 | (2006.01) |
| F16K 27/04 | (2006.01) |
| E21B 34/16 | (2006.01) |
| F16K 11/076 | (2006.01) |

(52) U.S. Cl.
CPC .............. *E21B 7/06* (2013.01); *F16K 11/076* (2013.01); *F16K 27/041* (2013.01); *E21B 34/16* (2013.01)

(58) Field of Classification Search
CPC ......... E21B 7/06; F16K 11/076; F16K 27/041
See application file for complete search history.

(56) References Cited

U.S. PATENT DOCUMENTS

| 4,431,069 A * | 2/1984 | Dickinson, III ........ E21B 7/067 175/320 |
| 5,520,255 A | 5/1996 | Barr et al. |
| 5,553,678 A | 9/1996 | Barr et al. |
| 5,706,905 A | 1/1998 | Barr |
| 5,803,185 A | 9/1998 | Barr et al. |
| 6,158,529 A | 12/2000 | Dorel |
| 7,389,830 B2 | 6/2008 | Turner et al. |
| 7,413,034 B2 | 8/2008 | Kirkhope et al. |
| 7,730,972 B2 * | 6/2010 | Hall ........................ E21B 10/62 175/73 |
| 8,469,104 B2 | 6/2013 | Downton |
| 8,640,793 B2 * | 2/2014 | Wentworth ............. E21B 44/00 175/45 |
| 8,869,916 B2 | 10/2014 | Clausen et al. |
| 9,145,736 B2 | 9/2015 | Peter et al. |

(Continued)

OTHER PUBLICATIONS

Ma, et al., Overview on vertical and directional drilling technologies for the exploration and exploitation of deep petroleum resources, Geomech. Geophys. Geo-energ. Geo-resour. (2016) 2:365-395.

*Primary Examiner* — Kevin R Barss
(74) *Attorney, Agent, or Firm* — Patterson Intellectual Property Law, P.C.; William Sekyi

(57) ABSTRACT

A downhole tool control system for a drill string rotary steerable tool that includes a body having an inner chamber, a piston gallery extending between the inner chamber and a piston port, and an exhaust gallery extending between the inner chamber and an exhaust port. A spool in the inner chamber is movable into a plurality of positions to direct and control the timing and duration of the flow of drilling fluid to energize pistons of the rotary steerable tool, and to de-energize the pistons. The spool includes a first passage in fluid communication with a drilling fluid inlet port but not the exhaust port, and a second passage in fluid communication with the exhaust port but not the drilling fluid inlet port.

20 Claims, 6 Drawing Sheets

(56) References Cited

U.S. PATENT DOCUMENTS

| | | | |
|---|---|---|---|
| 9,624,727 B1 | 4/2017 | Hutton | |
| 10,337,250 B2* | 7/2019 | Turner | G05B 15/02 |
| 10,683,702 B2 | 6/2020 | Conger et al. | |
| 2006/0243487 A1* | 11/2006 | Turner | E21B 7/068 |
| | | | 175/26 |
| 2009/0223716 A1* | 9/2009 | Eppink | E21B 17/1014 |
| | | | 175/25 |
| 2012/0160564 A1 | 6/2012 | Downton et al. | |
| 2013/0206396 A1* | 8/2013 | Hay | E21B 23/04 |
| | | | 166/381 |
| 2014/0014413 A1 | 1/2014 | Niina et al. | |
| 2015/0337598 A1 | 11/2015 | Rushton et al. | |
| 2019/0249494 A1 | 8/2019 | Winslow et al. | |
| 2019/0264822 A1* | 8/2019 | Weir | E21B 33/0355 |
| 2020/0141188 A1 | 5/2020 | Marshall et al. | |
| 2020/0392790 A1 | 12/2020 | Perry et al. | |
| 2020/0392791 A1 | 12/2020 | Nanayakkara et al. | |

\* cited by examiner

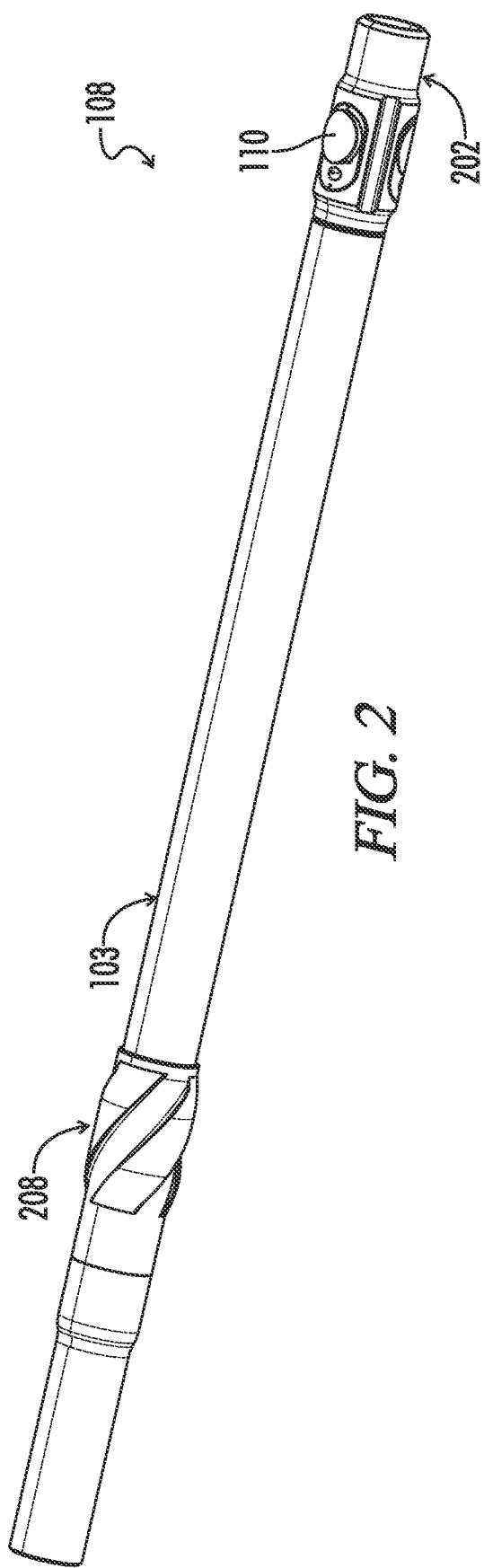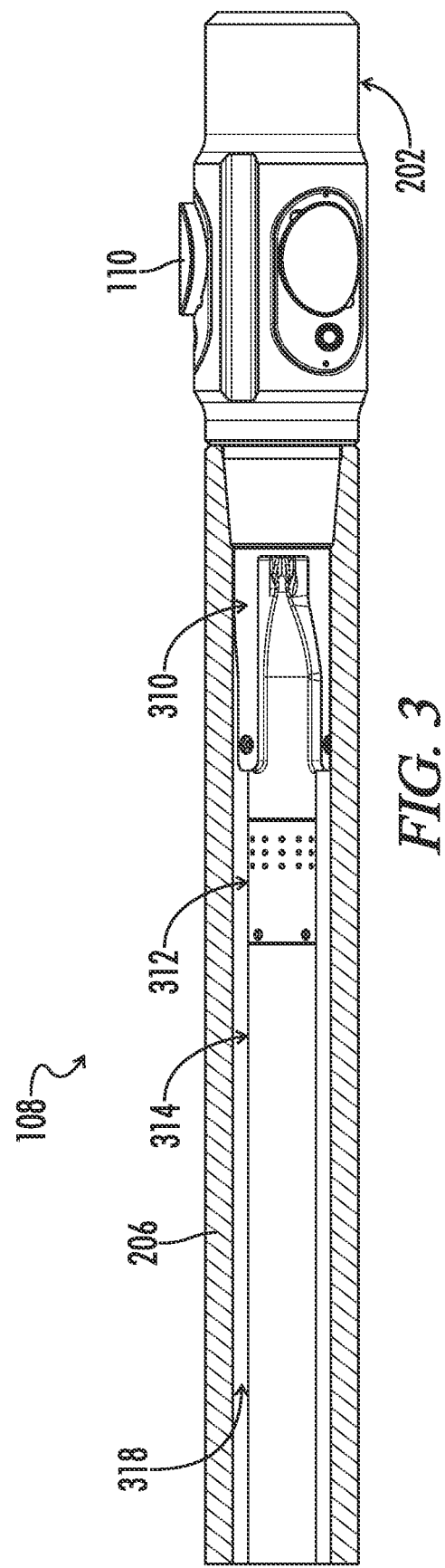

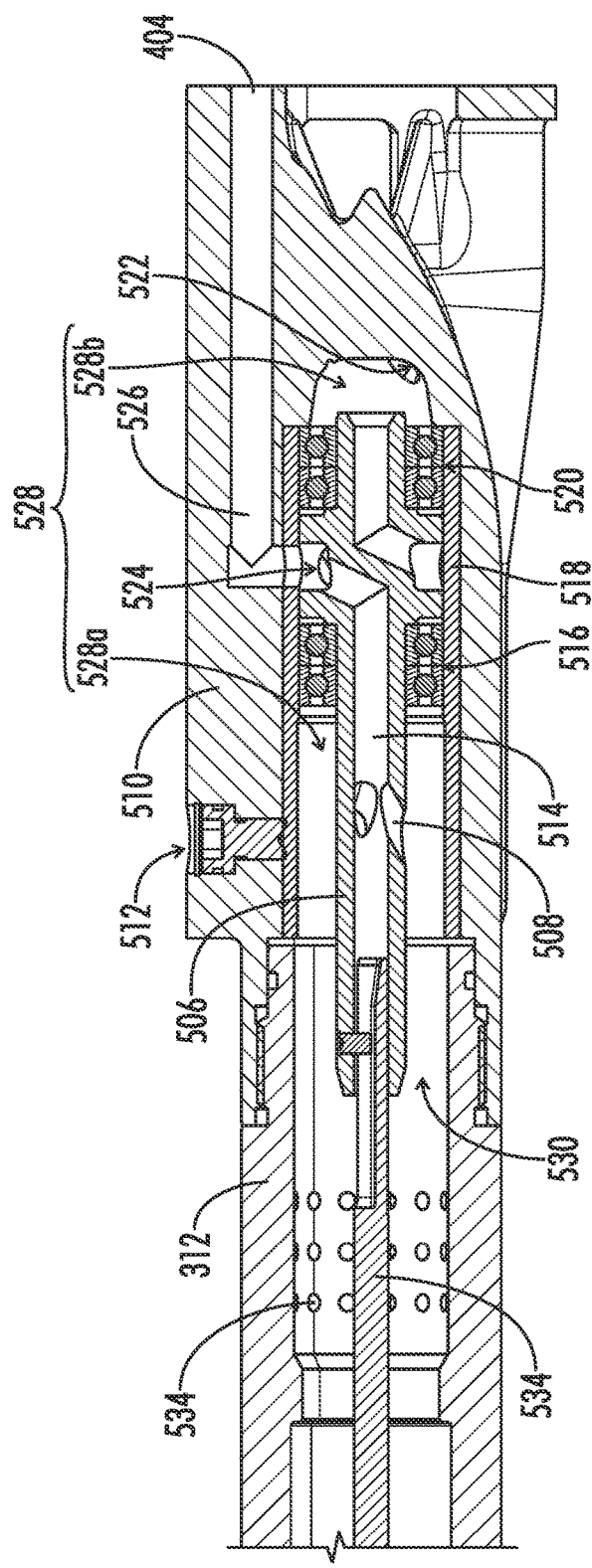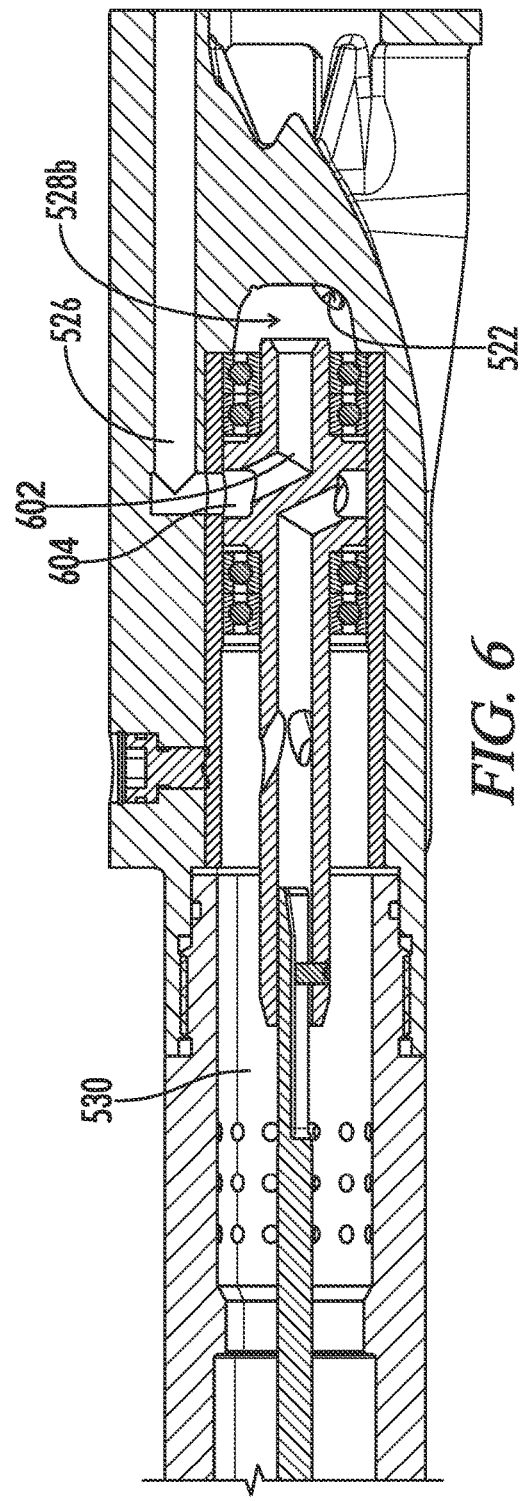

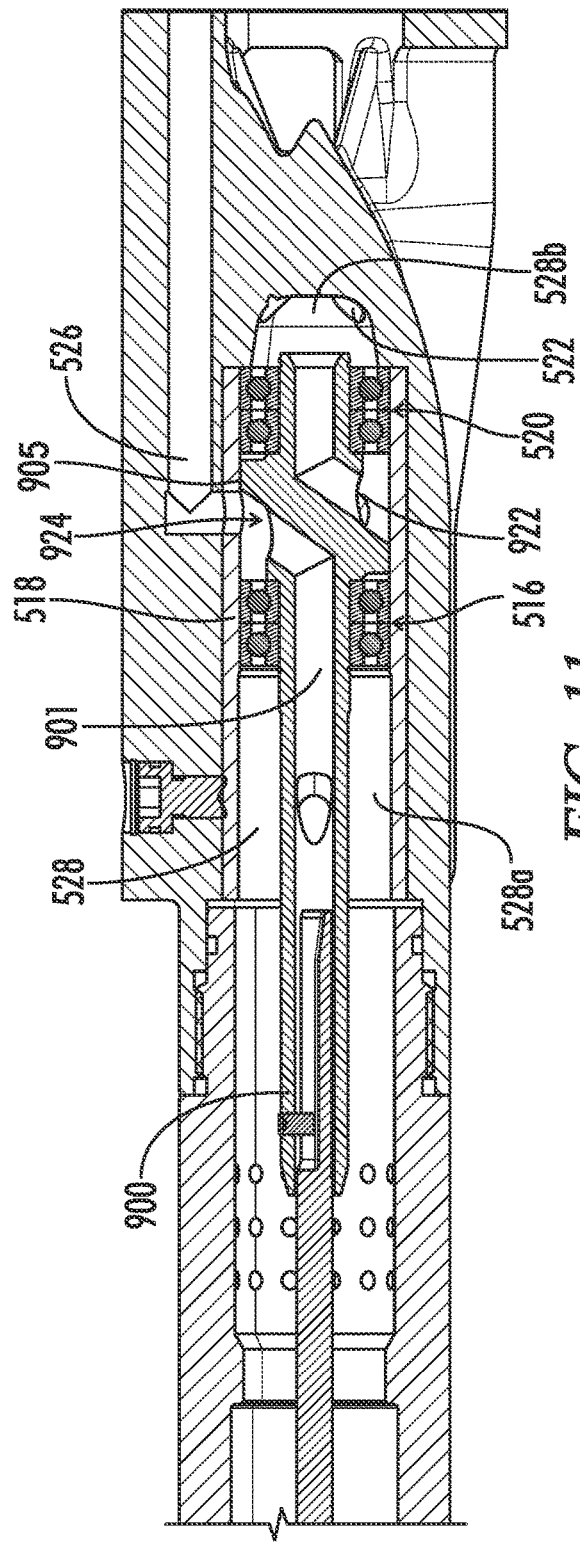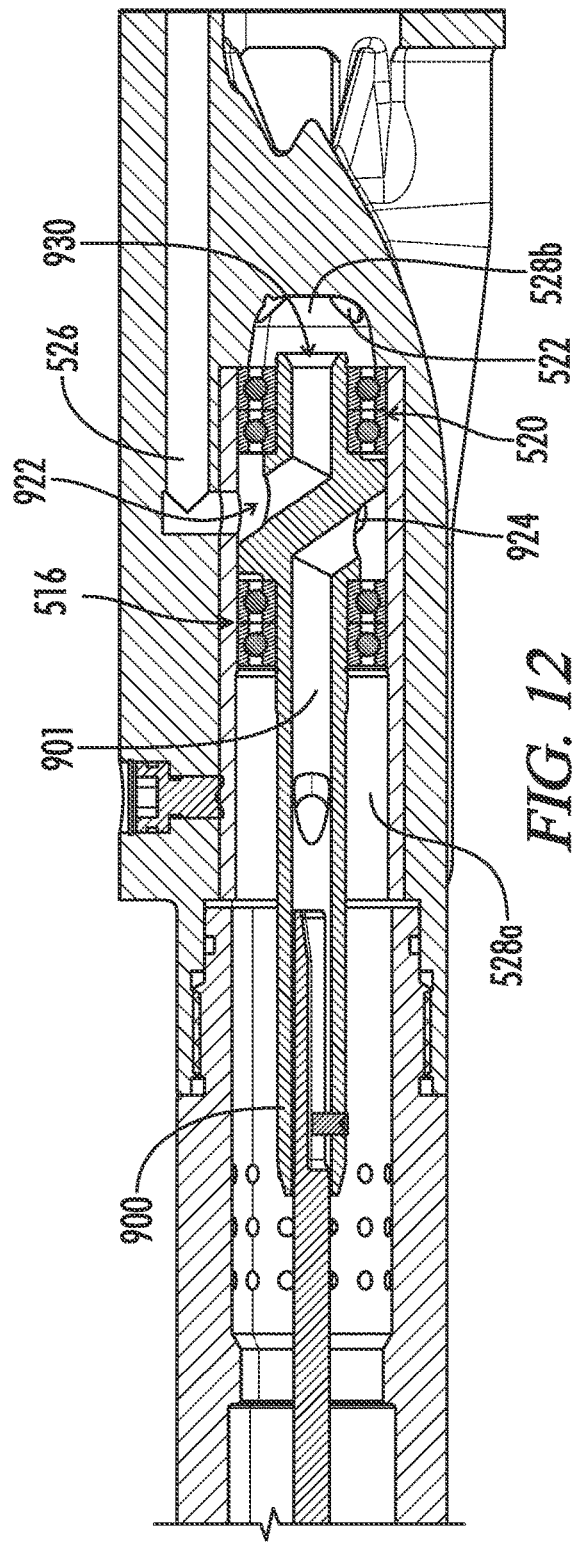

FLUID CONTROL VALVE FOR ROTARY STEERABLE TOOL

The present invention relates generally to a method and apparatus for controlling a rotary steerable tool for drilling a downhole formation. More particularly, but not exclusively, the present disclosure pertains to a fluid control valve and related method for controlling the steering and orientation in a rotary steerable tool for drilling oil and gas wells.

BACKGROUND OF THE INVENTION

In the oil and gas exploration and extraction industries, forming a wellbore conventionally involves using a drill string to bore a hole into a subsurface formation or substrate. The drill string, which generally includes a drill bit attached at a lower end of tubular members, such as drill collars, drill pipe, and optionally drilling motors and other downhole drilling tools, can extend thousands of feet or meters from the surface to the bottom of the well where the drill bit rotates to penetrate the subsurface formation. At times, drillers have found it useful to control the direction of drilling to follow desired non vertical trajectories to drill through or reach target subsurface formations. Thus, directional drilling can be particularly desirable to reach pockets of oil-bearing rock or to direct the well-bore away from other nearby well-bores. Typically, directional drillers initially drill wells vertically, or nearly vertically, until reaching a desired kickoff point or well depth when the driller attempts to deflect the drill bit and rapidly change the direction of drilling to steer drilling in a desired trajectory. The rapid change in the direction of drilling, also known as dog leg, can be expressed in degrees per 100 feet of course length. Directional drillers have used various tools and techniques to kick off wells to achieve desired dog leg, and also to more generally steer the progress of the drill bit though subsurface formations. Early methods of directional drilling used a drilling motor with a bent housing located close to the drill bit. However this method could be problematic because for the periods of time when using such a motor to direct the wellbore, the drill string did not rotate, resulting in slow drilling speed and issues with transporting the drilling cutting back to the surface.

The industry subsequently developed rotary steerable drilling tools which allowed the drill string to be continually rotated when both steering in a direction or just drilling ahead. Most rotary steerable tools can be placed into two categories: point-the-bit and push-the-bit. Point-the-bit tools generally have a shaft on the lower end of the tool which is connected to a drill bit and by pointing the shaft in the intended drilling direction, similar to the method described above for mud motors but with the add advantage of always rotating the drill string. Push-the-bit tools generally have pistons attached to pads which push against the side of the well-bore to direct or guide the drill bit into the required direction.

There are two conventional methods of deploying the pistons on 'push-the-bit' tools. The first uses a closed-loop hydraulics system with items such as a pump, fluid control valves, pistons, and a fluid reservoir. These systems can be quite complex and expensive to build and maintain. The second method involves using the fluid within the drill string which is pumped from the drilling rig though the bottom hole assembly and out through the drill bit. By using this method, the hydraulic power required by the pistons is generated by large motors and pumps at the rig site rather than downhole. One disadvantage of using drilling mud is that it can contain abrasive elements such as sand which rapidly wear the rotary steerable tools. Another disadvantage is drilling mud can also include particles specifically added to block up small holes in the rock formations, and these particles can also cause blockages within the rotary steerable tools. Blockages in the passages, channels and fluid galleries within these tools can impair fluid flow into and out of the pistons and degrade rotary steerable tool performance.

Rotary steerable tools generally include valves known as fluid control valves to control the flow of drilling fluid or mud into the tools' pistons. Two methods can conventionally be used for controlling the actuation of pistons. In one method, a rotary steerable tool includes a valve that can be opened to actuate the piston by allowing the flow of fluid pumped through the drill string into the piston's chamber. After a period of time, the valve is closed to trap fluid in the chamber as the drilling tool continues to rotate. Although the valve remains closed, these tools included small fluid passages with bleed nozzles that allowed fluid to continually escape from the piston chamber back into the wellbore. As fluid continues to escape from the piston chamber through a bleed nozzle piston, the force on the pads pushes the piston back into its inner position and the fluid is forced out through a small bleed nozzle. This is a simple system of operation only requiring the fluid control valve to perform one function, which is to control the flow of fluid into the piston chamber. The downside of this solution though is that the bleed nozzle in the piston can become blocked with lost circulation material or foreign debris. Furthermore energy is consumed in forcing the piston back into its inner position which can result in a reduction of piston force for actual steering control. This then results in reducing achievable rotary steerable tool build rates, particularly at the higher drilling string rotational speeds.

An alternative solution has been to use fluid control valves which control both the flow of fluid into the piston and controls the flow of fluid back out of the piston. But even with these alternative solutions, the design of these fluid control valves still require restricting the exhaust flow of drilling fluid from the chamber of a de-energized piston. In addition, several of these alternative solutions are impractical as their designs are unable to accommodate the large pressure differentials between high and low pressure sides of their fluid control valve components and maintain effective fluid tight seals. Accordingly, these alternative are still unable to achieve the desired high build rates that can beneficially provide drillers with additional flexibility. Furthermore, these alternatives have limited ability to adjust the relative timing, duration, and intensity of the activation and deactivation phases to control the performance profile according to specific wellbore needs. What is needed, then, is an improved rotary steerable tool that can achieve the desired high build rates particularly at the higher drilling string rotational speeds that can beneficially provide drillers with desired performance flexibility. What is also needed is a rotary steerable tool in which the relative timing and duration of the activation and deactivation phases can be adjusted by altering downhole operation, or by simple replacement of components, to control the performance profile according to specific wellbore needs.

BRIEF SUMMARY OF THE INVENTION

The present invention provides various embodiments that can address and improve upon some of the deficiencies of the prior art. In one embodiment, for example, a fluid control valve for a rotary steerable tool comprises a fluid control valve body having an inner chamber, a piston gallery extending between the inner chamber and a piston port, and an exhaust gallery extending between the inner chamber and an exhaust port, the inner chamber having a drilling fluid inlet port and also comprises a spool in the inner chamber. The spool has a first passage in fluid communication with the drilling fluid inlet port but not the exhaust port, and a second passage in fluid communication with the exhaust port but not the drilling fluid inlet port. The spool is movable to an actuation position in the inner chamber such that the first passage forms a fluid flow path between the piston gallery and the drilling inlet port, and also movable to a discharge position such that the second passage forms a fluid flow path between the piston gallery and the exhaust port.

According to one option, the fluid control valve body of this embodiment can include at least three piston galleries. According to another option the spool can be configured to rotate between the actuation position and the discharge position.

As another option, in the fluid control valve the exhaust gallery can have a flow path that is unrestricted. As yet another option, the fluid control valve the first passage can have a length and a first passage minimum flow cross sectional area at some point along its length. The second passage can have a length and a second passage minimum flow cross sectional area at some point along its length, wherein the exhaust gallery has a length and an exhaust gallery minimum flow cross sectional area, and wherein both the exhaust gallery minimum flow cross sectional area and the second passage minimum flow cross sectional area are greater than at least half of the first passage minimum flow cross sectional area.

Another embodiment of the present invention relates to a method of controlling a rotary steerable tool using a fluid control valve. The method includes the step of providing a fluid control valve body having an inner chamber, a piston gallery extending between the inner chamber and a piston port, and an exhaust gallery extending between the inner chamber and an exhaust port, the inner chamber having a drilling fluid inlet port. The method also includes the step of providing a spool in the inner chamber, the spool having a first passage in fluid communication with the drilling fluid inlet port but not the exhaust port, and a second passage in fluid communication with the exhaust port but not the drilling fluid inlet port. Additionally the method includes the steps of receiving fluid from the fluid inlet port into the first passage and discharging the fluid into the piston gallery, when the spool is in an actuation position, and receiving fluid from the piston gallery into the second passage and discharging the fluid into the exhaust gallery when the spool is in a discharge position.

According to one option, the method further includes rotating the spool through an angle from the actuation position to the discharge position. In this option, according to some alternatives, the fluid control valve body includes a plurality of piston galleries. According to one alternative, rotating the spool through an angle can additionally include rotating the spool through an intermediate angle wherein neither the first passage nor the second passage is in fluid communication with any of the plurality of piston galleries. According to another alternative, rotating the spool through an angle includes rotating the spool through an intermediate angle where the first passage and the second passage are in fluid communication with different piston galleries.

According to another option, the step of receiving fluid from the piston gallery into the second passage and discharging the fluid into the exhaust gallery when the spool is in a discharge position can also include discharging the fluid into the exhaust gallery with an unrestricted flow into the wellbore annulus. As an alternative in addition to this option, the first passage can have a length and a first passage minimum flow cross sectional area at some point along its length, the second passage can have a length and a second passage minimum flow cross sectional area at some point along its length, and the exhaust gallery can have a length and an exhaust gallery minimum flow cross sectional area, wherein the exhaust gallery minimum flow cross sectional area is greater than at least half of either the first passage minimum flow cross sectional area or the second passage minimum flow cross sectional area. In a further alternative, the exhaust gallery minimum flow cross sectional area can be greater than at least 75 percent of either the first passage minimum flow cross sectional area or the second passage minimum flow cross sectional area.

A further embodiment of the present invention is directed to a rotary steerable tool fluid control valve that comprises a fluid control valve body that has an inner chamber, a piston gallery extending between the inner chamber and a piston port, and an exhaust gallery extending between the inner chamber and an exhaust port, the inner chamber having a drilling fluid inlet port. The fluid control valve also comprises a spool in the inner chamber. The spool has a first passage in fluid communication with the drilling fluid inlet port but not the exhaust port and a second passage in fluid communication with the exhaust port but not the drilling fluid inlet port. The first passage has a length and a first passage minimum flow cross sectional area at some point along its length and the second passage has a length and a second passage minimum flow cross sectional area at some point along its length. The exhaust gallery also has a length and an exhaust gallery minimum flow cross sectional area. In this embodiment, the exhaust gallery minimum flow cross sectional area is greater than at least half of either the first passage minimum flow cross sectional area or the second passage minimum flow cross sectional area. Optionally, the exhaust gallery minimum flow cross sectional area of this embodiment can be greater than at least 75 percent of either the first passage minimum flow cross sectional area or the second passage minimum flow cross sectional area. The exhaust gallery minimum flow cross sectional area of this embodiment more preferably can be about the same area or greater than either the first passage minimum flow cross sectional area or the second passage minimum flow cross sectional area.

In an alternative aspect of this embodiment, the spool is movable to a first actuation position in the inner chamber such that the first passage forms a fluid flow path between the piston gallery and the drilling inlet port, and also movable to a first discharge position such that the second passage forms a fluid flow path between the piston gallery and the exhaust port. Optionally the fluid control valve body can include at least three piston galleries and a spool that is movable to a plurality of actuation positions in the inner chamber, such that the first passage forms a fluid flow path between each of the at least three piston galleries and the drilling inlet port, and also movable to a plurality of discharge positions such that the second passage forms a fluid flow path between each piston gallery and the exhaust port. According to one alternative, the spool can have an intermediate position wherein neither the first passage nor the second passage is in fluid communication with any of the plurality of piston galleries. According to another alternative, the spool can have an intermediate position wherein the first passage and the second passage are in fluid communication with different piston galleries.

BRIEF DESCRIPTION OF THE SEVERAL VIEWS OF THE DRAWINGS

FIG. 2 is a perspective view of a rotary steerable tool according to an embodiment of the present invention.

FIG. 3 is an elevational view of a steering body and a partial cut away elevational view of a collar according to an embodiment of the present invention.

FIG. 5 is a cross sectional view of a filter body and fluid control valve of a tool control system according to an embodiment of the present invention with a spool positioned to energize a piston.

FIG. 6 is an alternate cross sectional view of a filter body and fluid control valve of a tool control system according to an embodiment of the present invention with a spool positioned to de-energize a piston.

FIG. 11 is a cross sectional view of a fluid control valve of a tool control system incorporating a spool according to FIG. 9 in an alternate embodiment of the present invention with the spool positioned to energize a piston.

FIG. 12 is a cross sectional view of a fluid control valve of a tool control system incorporating a spool according to FIG. 9 in an alternate embodiment of the present invention with the spool positioned to de-energize a piston.

DETAILED DESCRIPTION OF THE INVENTION

Figure 1:
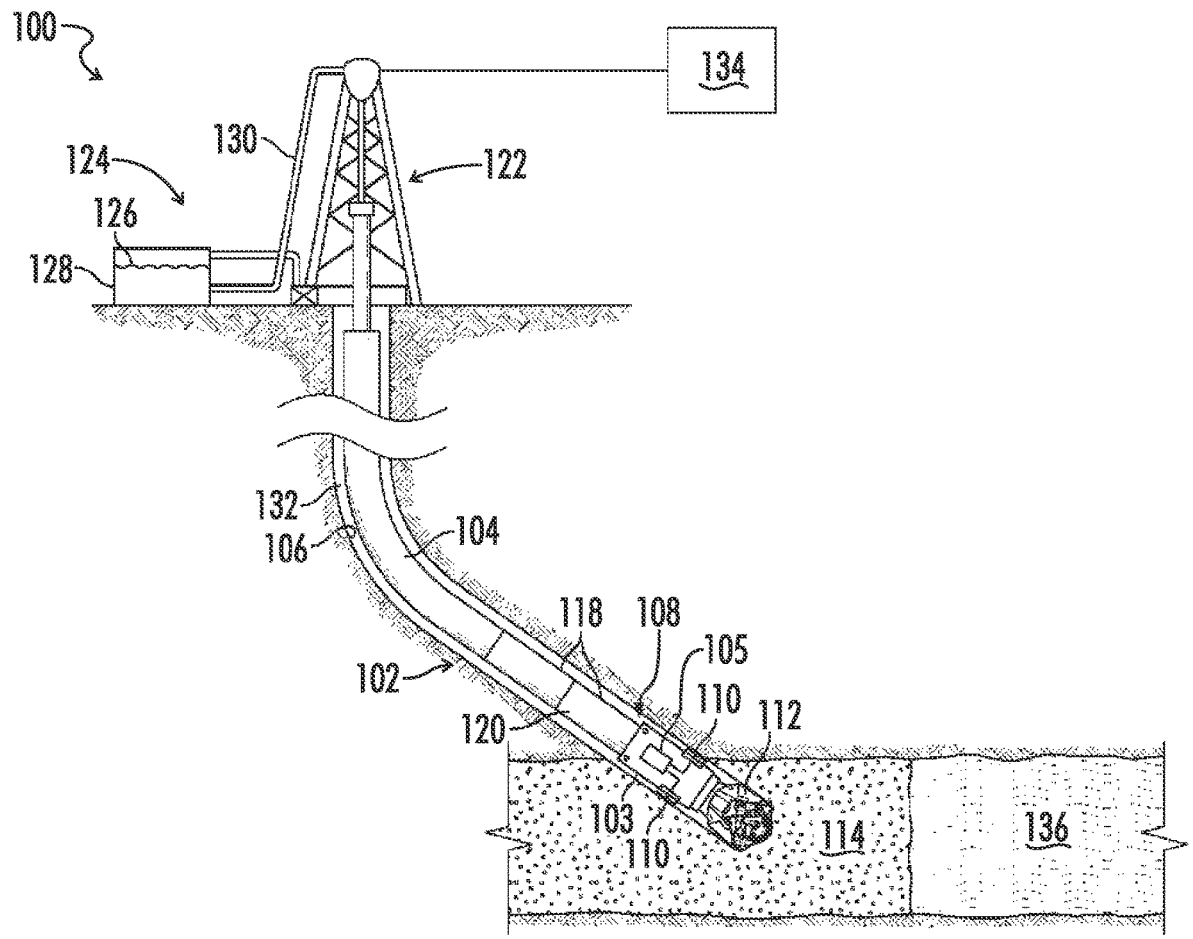
FIG. 1 is a schematic view of a drilling system according to an embodiment of the present invention.

Referring generally to FIG. 1, drilling systems such as drilling system 100 can utilize rotary steerable tools with fluid control valves to steer a drill as it bores through a subsurface formation. FIG. 1 illustrates an embodiment of the drilling system 100 as having a bottom hole assembly 102 which is part of a drill string 104 used to form a desired, directionally drilled wellbore 106. The illustrated drilling system 100 comprises a rotary steerable tool 108 that includes a steering body. The steering body includes at least one laterally movable steering pad 110 and is connected to a tool control system 105. Tool control system 105 controls an actuating piston in the steering body which is connected to steering pad 110. Under control of the tool control system 105, the actuating piston can extend to actuate steering pad 110. The tool control system 105 can include a fluid control valve and an electronic control unit. By way of example, the one or more steering pads 110 may be designed to act against a corresponding pivotable component of the rotary steerable tool 108 or against the surrounding wellbore wall to provide directional control. In this particular embodiment, the tool control system 105 is housed within a drill collar 103 of the rotary steerable tool 108. The drill collar 103 and the steering body, which together form the rotary steerable tool 108, are coupled with a drill bit 112 which is rotated to cut through a surrounding rock formation 114 which may be in a hydrocarbon bearing reservoir 136.

Depending on the environment and the operational parameters of the drilling operation, drilling system 100 may comprise a variety of other features. For example, drill string 104 may include additional drill collars 118 which, in turn, may be designed to incorporate desired drilling modules, e.g. logging-while-drilling and/or measurement-while-drilling modules 120. In some applications, stabilizers may be used along the drill string to stabilize the drill string with respect to the surrounding wellbore wall.

Various surface systems also may form a part of the drilling system 100. In the example illustrated, a drilling rig 122 is positioned above the wellbore 106 and a drilling fluid system 124, e.g. drilling mud system, is used in cooperation with the drilling rig 122. For example, the drilling fluid system 124 may be positioned to deliver a drilling fluid 126 from a drilling fluid tank 128. The drilling fluid 126 is pumped through appropriate tubing 130 and delivered down through drilling rig 122 and through a central cavity or bore of drill string 104. In many applications, the return flow of drilling fluid flows back up to the surface through an annulus 132 between the drill string 104 and the surrounding wellbore wall. The return flow may be used to remove drill cuttings resulting from operation of drill bit 114. The drilling fluid 126 also may be used as an actuating fluid to control operation of the rotary steerable tool 108 and its movable steering pad or pads 110. In this latter embodiment, flow of the drilling/actuating fluid 126 to steering pads 110 is controlled by tool control system 105 in a manner which enables control over the direction of drilling during formation of wellbore 106.

The drilling system 100 also may comprise many other components, such as a surface control system 134. The surface control system 134 can be used to communicate with rotary steerable tool 108. In some embodiments, the surface control system 134 receives data from downhole sensor systems and also communicates commands to the rotary steerable tool 108 to control actuation of tool control system 105 and thus the direction of drilling during formation of wellbore 106. In other applications, as discussed in greater detail below, control electronics are located downhole in the rotary steerable tool 108 and the control electronics cooperate with an orientation sensor to control the direction of drilling. However, the downhole, control electronics may be designed to communicate with surface control system 134, to receive directional commands, and/or to relay drilling related information to the surface control system.

FIG. 2 illustrates the rotary steerable tool 108 that includes steering body 202 with steering pad 110, drill collar 103 and stabilizer 208. The steering body 202 includes at least one piston connected to its associated steering pad 110. In this embodiment, steering body 202 includes three pistons and associated pads. The pistons are designed to extend from an inner to outer position, pushing its associated pad into press against the side of the wellbore to push the tool in the opposite direction.

The collar 206 is a typical drilling tool collar with a central passage way to allow for the flow of fluid from the drilling rig to pass through and also to house an electronic control unit.

FIG. 3 shows a side view of steering body 202 and a partial cut away view of the collar 103 which together form a rotary steerable tool. Although this figure shows the collar 206 as connected to steering body 202 to form a rotary steerable tool, collar 103 can, in other embodiments, be connected to other devices that can benefit from the functions of the tool control system 105, as an alternative to steering body 202. In the cut away view, the exterior wall of the rotary steerable tool collar 206 is cut away to show the central cavity 318 of the collar 103. The cavity 318 is an extension of, and is in fluid communication with, the uphole portions of the bore of the drill string 104. Therefore, drilling fluid 126 under pressure from the rig pumps flows through the rotary steerable tool cavity 318. As FIG. 3 also shows, electronic control unit 314, filter body 312 and fluid control valve 310 are located inside the rotary steerable tool collar 206. The fluid control valve 310 is an assembly of numerous components that will be described in more detail in FIG. 5. These components, alternatively, can collectively be referenced as fluid control valve assembly. The fluid control valve 310 attaches to the steering body 202, for example via a pin connection on the steering body 202, and diverts a proportion of drilling fluid via piston galleries in the fluid control valve 310 into flow galleries in steering body 202. These fluid galleries in steering body 202 are connected to steering body pistons that can extend under the pressure of the drilling fluid to actuate steering pads 110. The filter body 312 contains a filter screen that has a series of small holes through which some of the pumped drilling fluid 126 flows so that only filtered drilling fluid 126 enters the fluid control valve 310. Central cavity 318 also houses an electronics control unit 316 which is encased in a pressure barrel. In some embodiments, the electronics control unit 316 can measure the wellbore position and calculate the required steering direction. The electronics control unit 316 can also include a motor that actuates a spool of the fluid control valve 310.

Figure 4:
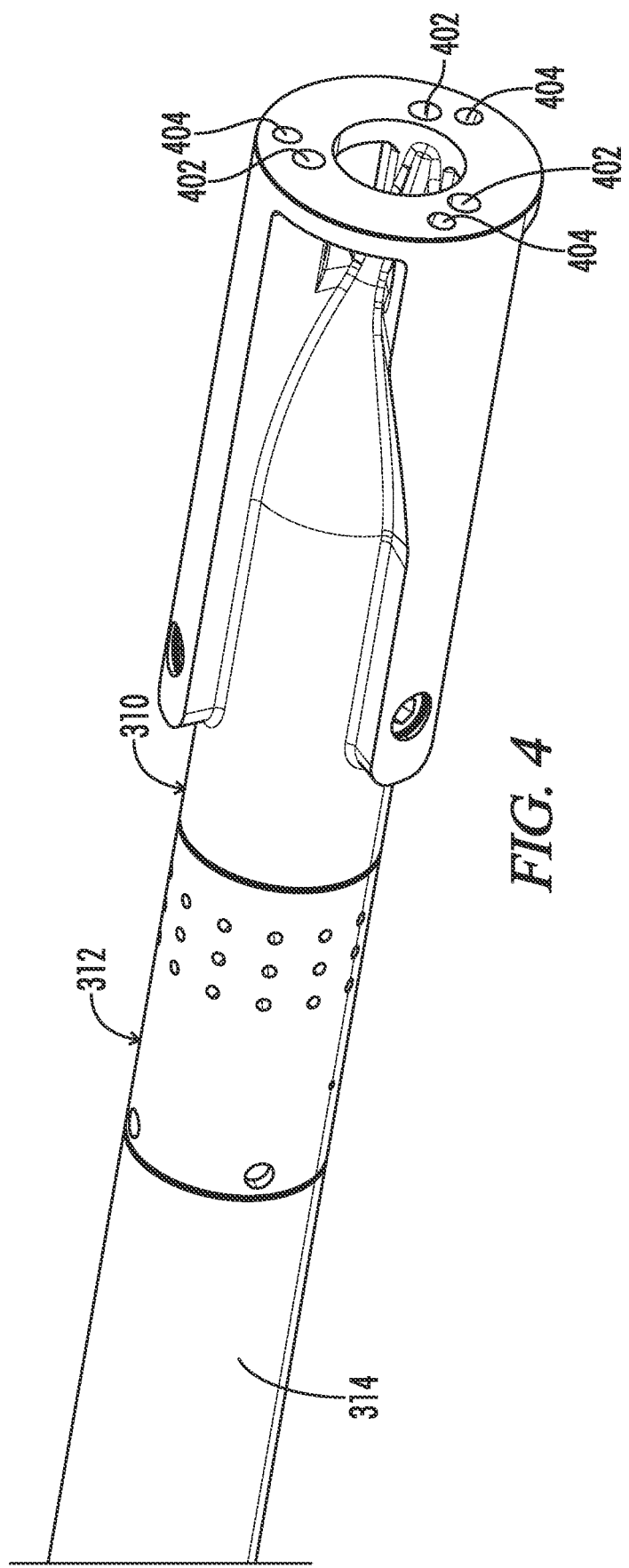
FIG. 4 is a partial perspective view of a tool control system according to an embodiment of the present invention.

FIG. 4 is a partial perspective view of the tool control system 105 showing the external surface and lower end of the fluid control valve 310, the filter body 312, and a partial view of the electronics control unit 316. Filter body 312 receives a proportion of the drilling fluid which is pumped from the rig and which is diverted into the fluid control valve through the filter body 312. The filter body 312 screens out large particulates from all drilling fluid 126 that enters fluid control valve 310. Fluid control valve 310 selectively directs drilling fluid 126 pumped from the rig through piston gallery outlet ports 404 and into fluid galleries of the steering body 202 to energize steering body pistons and actuate one or more steering pads 110. Drilling fluid 126 returning from a deenergizing piston, exits the fluid control valve 310 via exhaust gallery outlet ports 402 and the end of the exhaust galleries, and onwards to the low-pressure zone outside of the rotary steerable tool 108 which is commonly known as the annulus.

FIG. 5 is a cross sectional view through the filter body 312 and the fluid control valve 310 of the tool control system 105. The fluid control valve 310 is an assembly of components including a fluid control valve body 510 having an inner chamber 528 which is a central cavity in the body into which drilling fluid 126 can flow. Preferably, the inner chamber 528 can be a cavity with cylindrical side walls formed by the fluid control valve body 510, with a longitudinal central axis that is coaxial with the longitudinal axis of collar 206 and the rotary steerable tool 108. The inner chamber 528 extends to and has an opening at an uphole end of the fluid control valve body 510, identified as drilling fluid inlet port 530, where filter body 312 can be attached and through which filtered drilling fluid 126 can flow into an uphole chamber portion 528a of inner chamber 528. At least one a piston gallery 526 extends from inner chamber 528 to an exterior surface of the fluid control valve body 510 where it forms a piston gallery outlet port 404. Piston gallery 526 is a hollow passage through which drilling fluid 126 can flow between inner chamber 528 and galleries or passages in an attached actuating device, such as a steering body 202. In the case of an attached steering body 202, piston gallery 526 provides fluid communication between inner chamber 528 and the actuating pistons of the steering body 202 via galleries in the steering body 202. At least one exhaust gallery 522 extends from a downhole chamber portion 528b of inner chamber 528 to an exterior surface of the fluid control valve body 510 where it forms an exhaust gallery outlet port 402. Exhaust gallery 522 is a hollow passage through which drilling fluid 126 can flow out of the downhole chamber portion 528b of inner chamber 528 and ultimately into the annulus.

Fluid control valve 310 includes a valve member or spool 506 that has a first passage 514 through which fluid can flow between spool inlet ports 508 and first passage outlet 524, and a second passage 602 through which fluid can flow between second passage inlet 604 and downhole chamber portion 528b of inner chamber 528 (as shown in FIG. 6). Spool 506 is located within the inner chamber 528 and can be moved into various positions to control the flow of drilling fluid 126 from the drilling fluid inlet port 530 to each of the piston galleries 526 and to control the flow of drilling fluid 126 from each of the piston galleries 526 via the inner chamber 528 to the exhaust galleries 522. Spool 506 also isolates and maintains a fluid seal between the uphole chamber portion 528a and the downhole chamber portion 528b, preventing drilling fluid 126 in the uphole chamber portion 528a from directly communicating with or flowing into the downhole chamber portion 528b and escaping through any exhaust galleries. To isolate the uphole chamber portion 528a from downhole chamber portion 528b, spool 506 preferably extends across the entire cavity to seal against the periphery of the wall of inner chamber 528. According to some embodiments, the seal can be formed by tight tolerances between the spool and the periphery of the wall of inner chamber 528. With these tight tolerances, the gap between the spool and the periphery of the wall inner chamber 528 should be small enough to reduce leakage of drilling fluid from high fluid pressure areas in the uphole chamber portion 528a to low pressure areas in the downhole chamber portion 528b so that the adequate pressure differentials can be maintained between the chambers. According to other embodiments, instead of or in addition to relying on tight tolerances to form a seal, spool 506 can use any type of suitable sealing element to extend in the gap between spool 506 and the periphery of the wall of inner chamber 528 to form an effective, durable seal while minimizing friction between the spool 506 and the wall of inner chamber 528.

When spool 506 is positioned so that first passage outlet 524 aligns with at least a portion the opening of a piston gallery 526, the spool provides a flow path between uphole chamber portion 528a and the aligned piston gallery. In this position, the spool can receive drilling fluid 126 from drilling fluid inlet port 530 into the first passage 514 through spool inlet ports 508 which can flow to first passage outlet 524 and into piston gallery 526. Thus, in this position, although the first passage 514 is in fluid communication with the uphole chamber portion 528a and the drilling fluid inlet 530, the first passage 514 remains isolated from the downhole chamber portion 528b and exhaust gallery 522.

When spool 506 is positioned so that second passage inlet 604 aligns with at least a portion of the opening of a piston gallery 526, (as shown in FIG. 6) spool 506 provides a flow path between the aligned piston gallery 526 and the downhole chamber portion 528b. In this position, fluid in piston gallery 526 can flow through second passage 602 into the downhole chamber portion 528b and exit fluid control valve 310 through exhaust gallery 522. Thus, in this position, although the second passage 602 is in fluid communication with the downhole chamber portion 528b and the exhaust gallery 522, the second passage 602 remains isolated from the uphole chamber portion 528a and drilling fluid inlet port 530.

The positioning of the first passage outlet 524, second passage inlet 604, and piston gallery opening at the wall of the inner chamber 528, can determine the positions in which spool 506 provides a flow path between an aligned piston gallery 526 and either the drilling fluid inlet. The size and shape of the first passage outlet 524, second passage inlet 604 and piston gallery opening at the wall of the inner chamber 528 can determine the magnitude of the flow path at various positions of spool 506 and the ease with which drilling fluid 126 can flow into a piston from the drilling fluid inlet port 530 and through first passage 514 or flow out of a piston to the annulus via second passage 602, downhole chamber portion 528b and exhaust gallery 522.

A suitable motor can actuate the spool 506 and move it from one position to another depending on the positions of the outlets of the piston galleries 526 and the positions of the first passage outlet 524 and second passage inlet 604 by, for example, a rotational motion around a central longitudinal axis of the inner chamber and coaxially with the longitudinal axis of the rotary steerable tool, or by a longitudinal translational movement within the inner chamber. For example, if the openings of one or more piston galleries are distributed radially around the wall of the inner chamber 528 at a common position along the inner chamber's central axis that coincides with the positions of first passage outlet and second passage outlet, as shown in FIGS. 5 and 6, the motor can rotate spool 506 around the inner chamber's central axis so that the first passage outlet and second passage outlet alternately align with the outlets of the piston galleries. For example, the motor can, be an electrical motor housed in electronic control unit 314 that can be coupled via drive shaft 534 to rotate spool 506 around a central longitudinal axis of the rotary steerable tool 108. With such rotational actuation of the spool 506, controlling the speed of rotation and appropriately selecting the size, shape, and angular positioning of the first passage outlet 524 and the second passage inlet, 604, the fluid control valve 310 can control the timing and duration of piston extension and retraction enabling the rotary steerable tool to adjust tool performance to better achieve rotary steerable tool dogleg and desired rates of rotation based on different wellbore conditions. To facilitate low friction rotation while maintaining an effective fluid seal and also facilitating replacement and maintenance of spool 506, spool 506 can optionally be mounted in inner chamber 528 on bearings 516, 520 within sleeve 518. This arrangement can provide for more tightly controlling clearance and minimizing fluid to leak between spool 506, bearings 516, 520 and sleeve 518.

Figure 7:
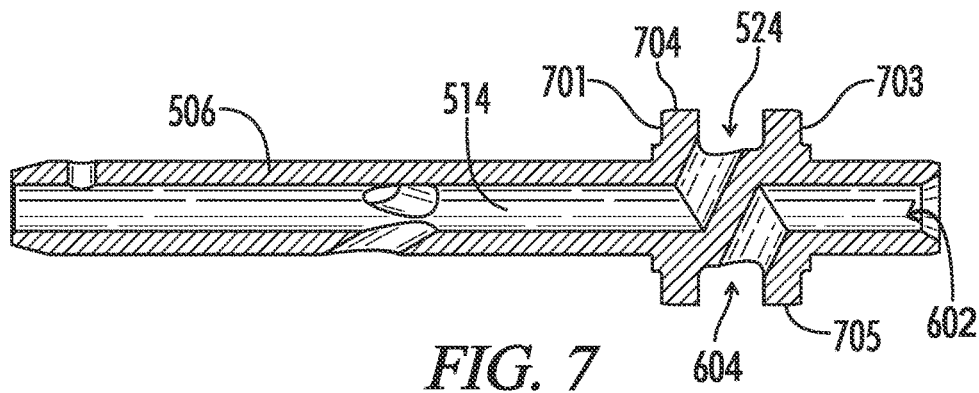
FIG. 7 is a cross sectional view of a spool according to one embodiment of the present invention.
Figure 8:
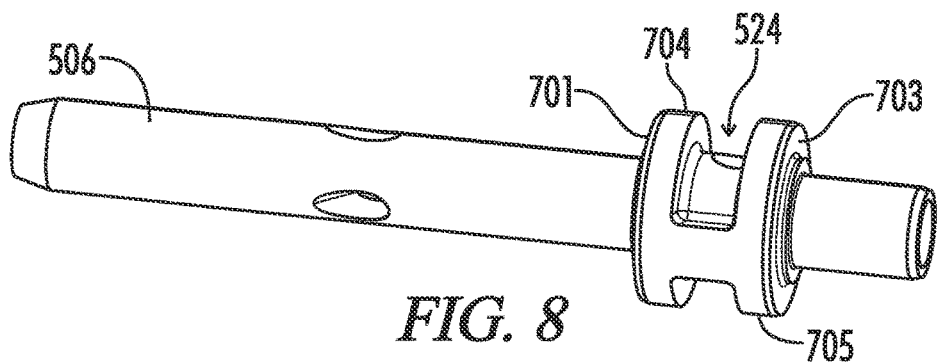
FIG. 8 is a perspective view of the embodiment of a spool according to FIG. 7.

As shown more clearly in FIGS. 7 and 8, in some embodiments, such as the embodiments shown in FIGS. 5 and 6, spool 506 of fluid control valve 310 can include a first passage 514 through which high pressure drilling fluid 126 from the uphole chamber portion 528a can enter and flow before exiting through the first passage outlet 524 and into piston gallery 526. Spool 506 can further include a lower wall or flange 705 which extends to the periphery of the wall of inner chamber 528 and around spool 506 and helps to seal high pressure drilling fluid 126 flowing through first passage outlet 524 from low pressure drilling fluid 126 in the downhole chamber portion 528b. Lower flange 705 therefore includes a low-pressure side 703 which can be exposed to low fluid pressure during operation. Spool 506 can also include an upper wall or flange 704 which extends to the periphery of the wall of inner chamber 528 and around spool 506 and helps to seal high pressure drilling fluid 126 flowing through first passage outlet 524 from high pressure drilling fluid 126 in the uphole chamber portion 528a. Lower flange 705 therefore include a high-pressure side 701 which can be exposed to high fluid pressure during operation. However, generally in operation, the pressure difference between fluid adjacent high pressure side 701 and fluid in or adjacent first passage outlet 524 is negligible compared to the pressure difference between fluid adjacent low-pressure side 703 and fluid adjacent in first passage outlet 524. The larger pressure differentials between low-pressure side 703 and first passage outlet 524 can potentially cause much more severe fluid leakage and pressure loss across lower flange 705 compared to the fluid leakage that the fluid pressure differential between high-pressure side 701 and first passage outlet 524 causes across upper flange 704. Thus, in the areas surrounding the first passage outlet 524, efficient operation of fluid control valve 310 can require flange 705 to provide a more effective and stronger seal than flange 704.

In addition, fluid control valve 310 can include a second passage inlet 604 and a second passage 602 through which low pressure drilling fluid 126 can exhaust from piston gallery 526 through downhole chamber portion 528b. To isolate and seal the flow of fluid in and adjacent to second passage inlet 604, upper wall or flange 704 helps to seal high pressure drilling fluid 126 in uphole chamber portion 528a from leaking into low pressure drilling fluid 126 in and adjacent to the second passage inlet 604. Similarly, to isolate and seal the flow of fluid in and adjacent to second passage inlet 604, lower wall or flange 705 helps to seal drilling fluid 126 flowing in and adjacent second passage inlet 604 from leaking into downhole chamber portion 528b. However, generally in operation, the pressure difference between fluid adjacent high pressure side 701 and fluid in or adjacent second passage inlet 604 is much more significant and greater compared to the pressure difference between fluid adjacent low-pressure side 703 and fluid adjacent in first passage outlet 604. The larger pressure differentials between high-pressure side 701 and second passage inlet 604 can potentially cause much more severe fluid leakage and pressure loss across upper flange 704 compared to the fluid leakage that the fluid pressure differential between low-pressure side 703 and second passage inlet 604 causes across lower flange 705. Thus, in the areas surrounding the second passage inlet 604, efficient operation of fluid control valve 310 can require flange 704 to provide a more effective and stronger seal than flange 705.

Figure 9:
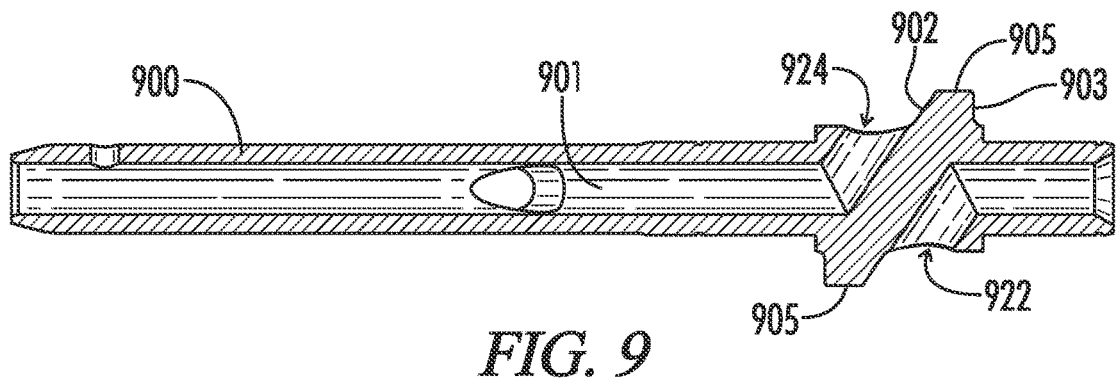
FIG. 9 is a cross sectional view of a spool according to an alternate embodiment of the present invention.
Figure 10:
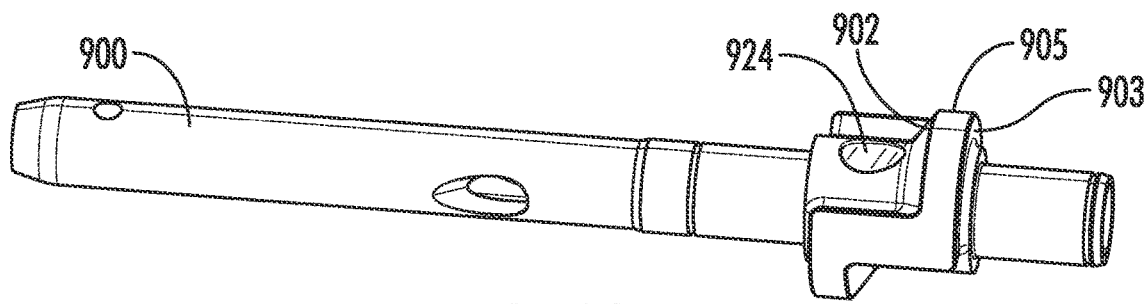
FIG. 10 is a perspective view of a spool according to FIG. 9.

A fluid control valve according to an alternative embodiment of a fluid control valve 310 can include an alternate spool 900, shown in FIGS. 9 and 10. Spool 900 can also include a first passage 901 and a first passage outlet 924, through which high pressure drilling fluid 126 from the uphole chamber portion 528a can enter and flow before exiting through the first passage outlet 924 and into piston gallery 526. In addition, spool 900 can also include a second passage and a second passage inlet 922 through which fluid can exit and exhaust from piston gallery 526 into downhole chamber portion 528b. However, as will be explained further below, because of the low pressure differentials that generally exist in normal operation in drilling fluid 126 between fluid in uphole chamber portion 528a and first passage outlet 924 can be negligible, spool 900 does not require an upper flange that extends to the periphery of the wall of inner chamber 528 to provide a seal between uphole chamber portion 528a and first passage outlet 924. Similarly, because of the low pressure differentials that generally exist in normal operation in drilling fluid 126 between fluid in downhole chamber portion 528b and second passage inlet 922 can be negligible, spool 900 does not require a lower flange that extends to the periphery of the wall of inner chamber 528 to provide a seal between downhole chamber portion 528b and second passage inlet 922. By avoiding the use of upper and lower flanges in areas where sufficient sealing can be provided by other means, drag and friction between spool 900 and the wall of inner chamber 528 can be reduced, facilitating easy rotation and movement of spool within the inner chamber 528 especially in the instances where drilling mud 126 contains high levels of loss circulation material. However, as can be seen in FIGS. 9 and 10, spool 900 includes a serpentine flange 905 that extends to the periphery of the wall of inner chamber 528 to provide a seal between downhole chamber portion 528b and second passage inlet 922, provide a seal between uphole chamber portion 528a and first passage outlet 924 and, in addition, provides a seal between the second passage inlet 922, which can contain fluid at low pressure, and first passage outlet 924, which can contain fluid at high pressure, during normal tool operation.

FIG. 11 shows alternative valve spool 900 installed in fluid control valve 301 in a first position to admit drilling fluid 126 in uphole chamber portion 528a through first passage 901, first passage outlet 924, and into piston gallery 525, and thereby energize a piston. Valve spool 900 can be movably mounted in fluid control valve 301 on a low friction a journal, bushing, or bearing, such as bearings 516 and 520, optionally within sleeve 518, to lower friction and the resistance of moving spool 900 as desired to control the flow of drilling fluid 126. Although no upper wall or flange separates uphole chamber portion 528a from first passage outlet 924, or lower chamber portion 528b from second passage inlet 922, bearings 516 and 520 should preferably be selected to provide a partial barrier to the flow of fluid between uphole chamber portion 528a from first passage outlet 924, and downhole chamber portion 528b from second passage inlet 922, and thereby provide sufficient sealing. Although some fluid may leak through the bearings 516, 520 the bearings should be selected to provide acceptably low leakage given the negligible pressure drop that should generally exist between uphole chamber portion 528a and first passage outlet 924, as well as between and downhole chamber portion 528b and second passage inlet 922, in normal tool operation. Meanwhile, serpentine flange 905 should be designed with close tolerances or appropriate seals against the periphery of the wall of inner chamber 528 to provide a sufficiently fluid tight seal, as previously described, between uphole chamber portion 528a and downhole chamber portion 528b, and also between second passage inlet 922 and first passage outlet 924.

FIG. 12 shows the spool 900 in a second position which allows drilling fluid 126 to be discharged from the piston gallery 526 through second passage inlet 922, through the second passage of spool 900, and into downhole chamber portion 528b.

According to some embodiments in which the fluid control valve body 510 includes a plurality of piston galleries 526, spool 506 can be configured so that at certain angles of rotation first passage outlet 524 at least partially aligns with an opening of first piston gallery 526, while the second passage inlet 604 simultaneously at least partially overlaps with the opening of a second piston gallery 526 so that the actuation of one piston through the first piston gallery 526 overlaps at least in part with the discharge of another piston as drilling fluid simultaneously exits the piston through the second piston gallery 526. According to other embodiments in which the fluid control valve body 510 includes a plurality of piston galleries 526, spool 506 can be configured so that there are no angles of rotation at which first passage outlet 524 aligns with an opening of first piston gallery 526 while the second passage inlet 604 simultaneously even partially overlaps with the opening of a second piston gallery 526. In such embodiments, there is no rotational position of spool 506 where the actuation of one piston through the flow of drilling fluid into a first piston gallery 526 overlaps with the discharge of another piston as drilling fluid simultaneously exits the other piston through the second piston gallery 526.

The cross sectional area open to drilling fluid flow in each piston gallery 526 and first passage 524 along the flow path from the drilling fluid inlet port 530 into a piston being energized can also affect the ability of the tool control system 105 to actuate a connected device, such as a steering body 202. Additionally, the cross sectional area open to drilling fluid flow in each piston gallery 526, exhaust gallery 522, and second passage 602 along the flow path of drilling fluid 126 from a piston to the annulus as the piston exhausts drilling fluid 126 and de-energizes it can also affect the performance of the tool control system 105 in actuating a connected device, such as a steering body 202. Easier, more open flow of drilling fluid 126 along its flow path can allow the control system 105 to provide increased performance such as increased tool rotation rates (RPM), more dogleg, and the ability to handle larger volumes of lost circulation material when actuating a steering body. Other potential benefits can include reducing back pressure on pistons as they exhaust drilling fluid. Reducing back pressure can result in lower forces on the pistons and reduced piston wear. Accordingly, the drilling fluid's path from a piston, via a piston gallery 526, second passage 602, and inner chamber 528, through exhaust gallery 522 and any other galleries or passages that may be located between the exhaust gallery outlet port 402 till its exit to the annulus, preferably includes no small restrictions such as bleed nozzles. In this way, the drilling fluid can travel from the piston to the low-pressure zone of the annulus with a minimal pressure drop. To minimize pressure drop, the cross sectional area of the drilling fluid's flow path as it exits from a piston when it is de-energized should not be unduly restricted as compared to the flow path of the drilling fluid that enters the piston during activation. Accordingly, preferably the minimum flow cross sectional area, i.e., the minimum cross sectional area open to drilling fluid flow along either the length of the exhaust gallery 522 or along the length of the second passage 602 is greater than at least half of the minimum flow cross sectional area at any point along the length of the first passage 514. More preferably, the minimum cross sectional area open to drilling fluid flow along either the length of the exhaust gallery 522 or along the length of the second passage 602 is greater than at least 75 percent of the minimum flow cross sectional area at any point along the length of the first passage 514. Even more preferably, the minimum cross sectional area open to drilling fluid flow along either the length of the exhaust gallery 522 or along the length of the second passage 602 is about the same as or greater than the minimum flow cross sectional area at any point along the length of the first passage 514. Put another way, the minimum cross sectional area open to drilling fluid flow along either the length of the exhaust gallery 522 or along the length of the second passage 602 is unrestricted and is at least 95 percent of the minimum flow cross sectional area at any point along the length of the first passage 514. Yet more preferably, drilling fluid flow through exhaust gallery 522 should not be reduced by downstream restrictions in the drilling fluid flow path beyond exhaust port 402 that reduces the flow cross sectional area to 95 percent or less of the minimum flow cross sectional area of the first passage 514.

Thus, although there have been described particular embodiments of the present invention of a new and useful Fluid Control Valve for Rotary Steerable Tool it is not intended that such references be construed as limitations upon the scope of this invention except as set forth in the following claims.

What is claimed is:

1. A fluid control valve for a rotary steerable tool comprising:
   a fluid control valve body having an inner chamber, a piston gallery extending between the inner chamber and a piston port, and an exhaust gallery extending between the inner chamber and an exhaust port, the inner chamber having a drilling fluid inlet port;
   a spool in the inner chamber, the spool having a first passage in fluid communication with the drilling fluid inlet port but not the exhaust port, and a second passage in fluid communication with the exhaust port but not the drilling fluid inlet port;
   wherein the spool is movable to an actuation position in the inner chamber such that the first passage forms a fluid flow path between the piston gallery and the drilling inlet port, and also movable to a discharge position such that the second passage forms a fluid flow path between the piston gallery and the exhaust port.

2. The fluid control valve of claim 1, wherein the fluid control valve body includes at least three piston galleries.

3. The fluid control valve of claim 1, wherein the spool is configured to rotate between the actuation position and the discharge position.

4. The fluid control valve of claim 1, wherein the exhaust gallery has a flow path that is unrestricted.

5. The fluid control valve of claim 1, wherein the first passage has a length and a first passage minimum flow cross sectional area at some point along its length, wherein the second passage has a length and a second passage minimum flow cross sectional area at some point along its length, wherein the exhaust gallery has a length and an exhaust gallery minimum flow cross sectional area, and wherein both the exhaust gallery minimum flow cross sectional area and the second passage minimum flow cross sectional area are greater than at least half of the first passage minimum flow cross sectional area.

6. A method of controlling a rotary steerable tool using a fluid control valve, the method comprising:
   providing a fluid control valve body having an inner chamber, a piston gallery extending between the inner chamber and a piston port, and an exhaust gallery extending between the inner chamber and an exhaust port, the inner chamber having a drilling fluid inlet port, and providing a spool in the inner chamber, the spool having a first passage in fluid communication with the drilling fluid inlet port but not the exhaust port, and a second passage in fluid communication with the exhaust port but not the drilling fluid inlet port;
   receiving fluid from the fluid inlet port into the first passage and discharging the fluid into the piston gallery, when the spool is in an actuation position; and
   receiving fluid from the piston gallery into the second passage and discharging the fluid into the exhaust gallery when the spool is in a discharge position.

7. The method of controlling a rotary steerable tool of claim 6, further comprising rotating the spool through an angle from the actuation position to the discharge position.

8. The method of controlling a rotary steerable tool of claim 7, wherein the fluid control valve body includes a plurality of piston galleries.

9. The method of controlling a rotary steerable tool of claim 8, wherein rotating the spool through an angle includes rotating the spool through an intermediate angle wherein neither the first passage nor the second passage is in fluid communication with any of the plurality of piston galleries.

10. The method of controlling a rotary steerable tool of claim 8, wherein rotating the spool through an angle includes rotating the spool through an intermediate angle wherein the first passage and the second passage are in fluid communication with different piston galleries.

11. The method of controlling a rotary steerable tool of claim 6, wherein discharging the fluid into the exhaust gallery when the spool is in a discharge position include discharging the fluid into the exhaust gallery with an unrestricted flow into the wellbore annulus.

12. The method of controlling a rotary steerable tool of claim 6, wherein the first passage has a length and a first passage minimum flow cross sectional area at some point along its length, wherein the second passage has a length and a second passage minimum flow cross sectional area at some point along its length, wherein the exhaust gallery has a length and an exhaust gallery minimum flow cross sectional area, and wherein both the exhaust gallery minimum flow cross sectional area and the second passage minimum flow cross sectional area are greater than at least half of the first passage minimum flow cross sectional area.

13. The method of controlling a rotary steerable tool of claim 12, wherein both the exhaust gallery minimum flow cross sectional area and the second passage minimum flow cross sectional area are greater than at least 75 percent of either the first passage minimum flow cross sectional area.

14. A rotary steerable tool fluid control valve comprising:
   a fluid control valve body having an inner chamber, a piston gallery extending between the inner chamber and a piston port, and an exhaust gallery extending between the inner chamber and an exhaust port, the inner chamber having a drilling fluid inlet port;
   a spool in the inner chamber, the spool having a first passage in fluid communication with the drilling fluid inlet port but not the exhaust port, and a second passage in fluid communication with the exhaust port but not the drilling fluid inlet port;
   wherein the first passage has a length and a first passage minimum flow cross sectional area at some point along its length, wherein the second passage has a length and a second passage minimum flow cross sectional area at some point along its length, wherein the exhaust gallery has a length and an exhaust gallery minimum flow cross sectional area, and wherein both the exhaust gallery minimum flow cross sectional area and the second passage minimum flow cross sectional area are greater than at least half of the first passage minimum flow cross sectional area.

15. The rotary steerable tool fluid control valve of claim 14, wherein the exhaust gallery minimum flow cross sectional area and the second passage minimum flow cross sectional area are greater than at least 75 percent of the first passage minimum flow cross sectional area.

16. The rotary steerable tool fluid control valve of claim 14, wherein both the exhaust gallery minimum flow cross sectional area and the second passage minimum flow cross sectional area is about the same area or greater than the first passage minimum flow cross sectional area.

17. The rotary steerable tool fluid control valve of claim 14, wherein the spool is movable to a first actuation position in the inner chamber such that the first passage forms a fluid flow path between the piston gallery and the drilling inlet port, and also movable to a first discharge position such that the second passage forms a fluid flow path between the piston gallery and the exhaust port.

18. The rotary steerable tool fluid control valve of claim 17, wherein the fluid control valve body includes at least three piston galleries; and
    wherein the spool is movable to a plurality of actuation positions in the inner chamber such that the first passage forms a fluid flow path between each of the at least three piston galleries and the drilling inlet port, and also movable to a plurality of discharge positions such that the second passage forms a fluid flow path between each piston gallery and the exhaust port.

19. The rotary steerable tool fluid control valve of claim 18, wherein the spool has an intermediate position wherein neither the first passage nor the second passage is in fluid communication with any of the plurality of piston galleries.

20. The rotary steerable tool fluid control valve of claim 18, wherein the spool has an intermediate position wherein the first passage and the second passage are in fluid communication with different piston galleries.

\* \* \* \* \*